United States Patent [19]

Nicoud et al.

[11] Patent Number: 5,271,869
[45] Date of Patent: Dec. 21, 1993

[54] PLASMA PRODUCING GAS FOR PLASMA PROJECTION OF METALLIC OXIDE

[75] Inventors: Daniel Nicoud, Metz; Jean-Martial Leger, Mery Sur Oise; Pierre Fauchais; Alain Grimaud, both of Limoges, all of France

[73] Assignee: L'Air Liquide, Societe Anonyme Pour L'Etude EI L'Exploitation des Procedes Georges Claude, Paris, France

[21] Appl. No.: 700,781

[22] Filed: Mar. 28, 1991

[30] Foreign Application Priority Data

Apr. 4, 1990 [FR] France .................. 90.04307

[51] Int. Cl.⁵ ................. C01B 3/00
[52] U.S. Cl. .................. 252/372; 427/453; 427/452; 427/455; 427/456
[58] Field of Search ......................... 252/372

[56] References Cited

U.S. PATENT DOCUMENTS

3,630,770 12/1971 Favreau .
3,658,572 4/1972 Chu .

FOREIGN PATENT DOCUMENTS

2251153 6/1975 France .

OTHER PUBLICATIONS

Zhevin. Prikl Teor Fiz 9, 1977, pp. 51-53.
Japan, Koka. Tokkyo Kato JP 60, 116725 C.A. 103, 219580t 1985.
Gouesbet et al., C.A. 91; 115995z 1179, Alta Astronaut 1979, 6(3–) 477–89.
Itterbeck et al., Proc. Phys. Soc. (London) C.A. 41 1513h 1947, 58, 615–23 (1946).
Justi, Forsch. Gebiete Ingenieurw, C.A. 40 8⁵ 1946, 15, No. 1 18–21 (1944).
Zhavrin, Yu I. C.A. 90 110231s 1979 Prikl Teor Fiz 1977, 51-3.
Zhavrin, et al., C.A. 85, 112870 1976. Vsb. Obshci i Prikl Fizika, Alaa-ata, 1974 (9) 47-53.

Primary Examiner—Howard T. Mars
Attorney, Agent, or Firm—Young & Thompson

[57] ABSTRACT

The plasma producing gas consists of a ternary mixture of helium, argon and hydrogen and contains at least about 10% hydrogen, typically 30 to 70% helium, 10 to 50% argon and 10 to 25% hydrogen, preferably 20% (±5%) hydrogen. Use for the plasma projection of metallic oxide.

5 Claims, 1 Drawing Sheet

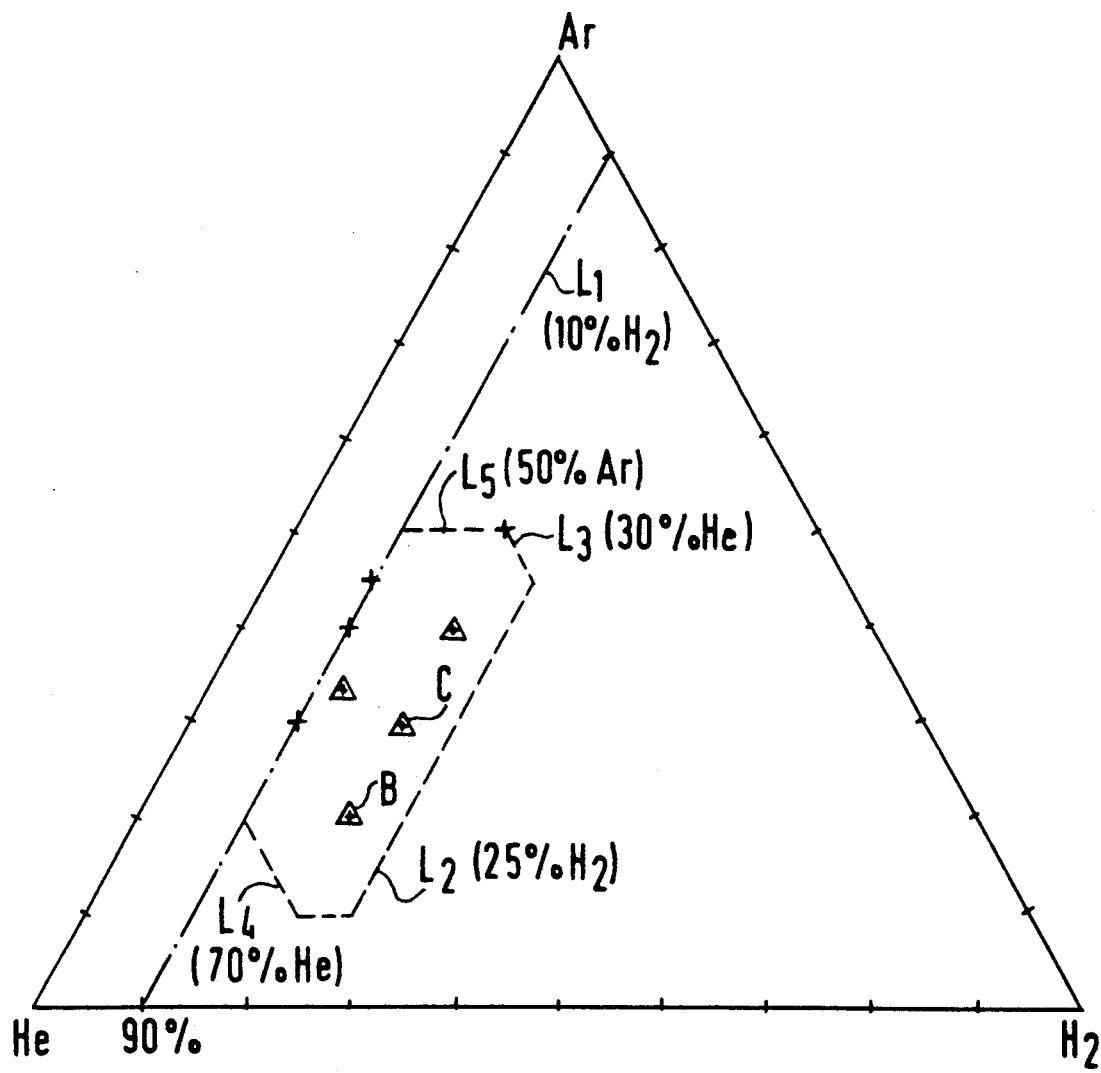

PLASMA PRODUCING GAS FOR PLASMA PROJECTION OF METALLIC OXIDE

BACKGROUND OF INVENTION

1. Field of the Invention

The present invention relates to plasma-producing gases for the plasma projection of metallic oxides.

2. Description of Prior Art

Plasma projection is a process of coating under heat which consists in introducing a particulate material into a plasma jet wherein the particles are melted and accelerated before being flattened against the surface of the material to be coated. The main applications are the production of anti-wear, anti-corrosion, anti-friction deposits or deposits which act as heat and/or electrical barriers.

The operation is carried out in the presence of ambient air (APS process), or in an enclosure containing a neutral gas (LPPS process at low pressure, IPS under controlled atmosphere, ATC under controlled atmosphere and temperature).

The control of the parameters during plasma projection is difficult, since the quality and the speed of deposit depend largely on the molten state of the particles upon impact. It is thus necessary to entirely melt the particles but at the same time they should be prevented from being vaporised. It is therefore necessary to simultaneously control the heat conductivity of the plasma jet and the time of residence of the particles in the latter, this time, in particular, being a function of the length of the plasma jet.

Plasma producing gases are already known which consist of a binary mixture of argon and hydrogen (typically 75 to 95 volume % of argon and 5 to 25 volume % of hydrogen), as well as argon and helium.

The present invention aims at proposing a plasma producing gas enabling to obtain a plasma jet which is more homogeneous for a longer length of the jet, i.e. a jet presenting a less degraded transverse heat gradient on the edges of the jet and this, on a more substantial length at the outlet of the torch.

SUMMARY OF INVENTION

For this purpose, according to a characteristic to the invention, the plasma producing gas consists of a ternary mixture of helium, argon and hydrogen, containing at least about 10% hydrogen and typically at least about 30% helium.

Such a ternary mixture used for the plasma projection presents, with respect to the argon-hydrogen binary mixtures, (in percentage of powder effectively deposited with respect to the quantity of powder injected) a considerably improved yield, exceeding 60% and which could reach 70% and more.

With respect to the binary mixtures of helium and argon, the ternary mixture according to the invention gives to the plasma jet a better heat conductivity, which produces, for a lesser cost of energy, a better heating of the particles, and therefore an increased speed of deposit by giving a better melting/adhesion of the deposit on the element to be covered and a wider and more homogeneous covering surface.

On the other hand, with such a ternary mixture, the plasma jet is less subject to the phenomenom of pumping with ambient atmosphere, which facilitates its use in the APS processes.

The use of a ternary mixture according to the invention enables to simultaneously controlling the heat conductivity of the plasma, and therefore the speed of warming up of the particles, and the dynamic viscosity of the plasma to which the dimensions of the plasma jet are related.

The use of a ternary mixture according to the invention also enables, for some deposits, to obtaining in a relatively cheap manner, and for a wide spectrum of uses, deposits having an improved mechanical cohesion and presenting for example a "strand" of deposit which is more widely spread, the deposit having an improved compactness, hardness and adhesion as well as a reduced porosity.

BRIEF DESCRIPTION OF DRAWINGS

On the diagram of the single figure, the preferred ranges and compositions of the plasma producing gas according to the invention have been represented.

DESCRIPTION OF PREFERRED EMBODIMENTS

It has been experimentally observed, as shown by the compositions represented by crosses, that the whole of the noted advantages mentioned above was obtained for a volume percentage of hydrogen higher than 8% of the volume of gas, preferably higher than 10% (line $L_1$), and for a content of argon higher than 50% (line $L_5$).

The best experimental results were obtained with the compositions represented by the points inserted in a triangle, i.e. for a content of hydrogen lower than 25% (line $L_2$), preferably about 20% ($\pm 5\%$), and for a content of helium higher than 30% (line $L_3$).

Thus, the composition ranges of the ternary mixture are from 30 to 70% helium, 10 to 50% argon and 10 to 25% hydrogen, more particularly from 35 to 65% helium, 20 to 45% argon and 10 to 25% hydrogen, typically from 35 to 60% helium, 20 to 40% argon and 10 to 25% hydrogen. More specifically, the content of helium is advantageously 50% ($\pm 5\%$).

The preferred composition, bearing in mind the lifespan of the plasma torches presently available, is that, illustrated at C, containing 50% helium, 30% argon and 20% hydrogen. It enables obtaining remarkably imcreased deposits of powder, reaching 70%, for example with alumina.

Composition B (60% helium, 20% argon and 20% hydrogen) also offers excellent results, however it is limited to a continuous use with existing plasma torches. With future generations of plasma torches, it is believed that improved compositions incorporating up to 70% helium (line $L_4$) and 20 to 25% hydrogen could be used on an industrial basis.

The process according to the invention is preferably used for the deposit of metallic oxides such as alumina, zirconia, yttrium containing zirconia ($ZrO_2Y_2O_3$), silica, $Cr_2O_3$ (for example for braking devices), superalloys of the type MCrAlY, NiAl, super-conductor of the type YBaCuO, or hydroxyapatite (for protheses that can be implanted).

Although the present invention has been described with respect to preferred embodiments, it is not limited thereby, but, on the contrary, is capable of modifications and variants which will be obvious to one skilled in the art, in particular in the field of welding and heat treatment of surfaces.

We claim:

1. Plasma producing gas consisting of a ternary mixture of 30–70% helium, 10–50% argon, and 10–25% hydrogen.

2. Plasma producing gas according to claim 1, which contains 35–65% helium, 20–45% argon, and 10–25% hydrogen.

3. Plasma producing gas according to claim 2, which contains 35–60% helium, 20–40% argon, and 10–25% hydrogen.

4. Plasma producing gas according to claim 3, which contains 15–25% hydrogen.

5. Plasma producing gas according to claim 4, which contains 45–55% helium.

* * * * *